Feb. 1, 1938.  S. W. ALDERFER  2,107,067
ELASTIC MATERIAL AND METHOD OF MAKING SAME
Filed June 13, 1935  2 Sheets-Sheet 1
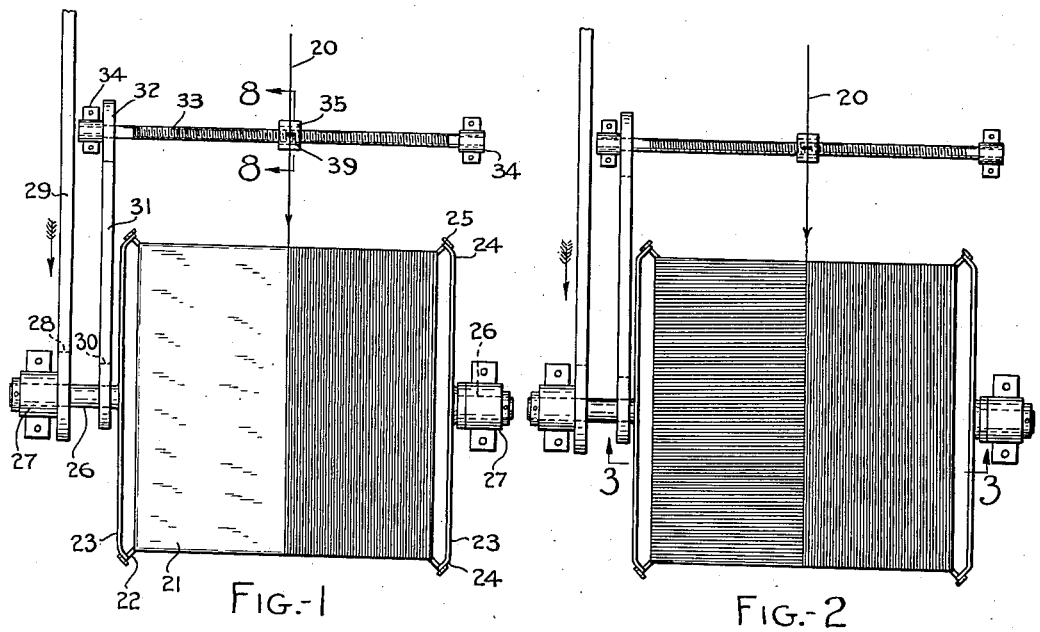
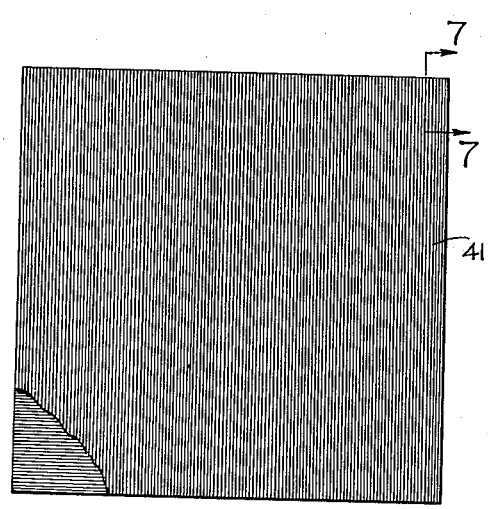
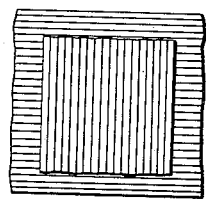
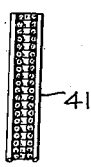
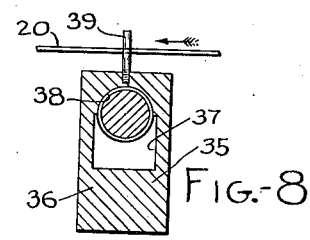
INVENTOR
STERLING W. ALDERFER
BY Albert L. Ely
ATTORNEY Feb. 1, 1938.  S. W. ALDERFER  2,107,067
ELASTIC MATERIAL AND METHOD OF MAKING SAME
Filed June 13, 1935  2 Sheets-Sheet 2

INVENTOR
STERLING W. ALDERFER
BY
Albert L. Ely
ATTORNEY

Patented Feb. 1, 1938

2,107,067

UNITED STATES PATENT OFFICE 2,107,067

ELASTIC MATERIAL AND METHOD OF MAKING SAME

Sterling W. Alderfer, Akron, Ohio, assignor of one-half to Edward D. Andrews, Akron, Ohio Application June 13, 1935, Serial No. 26,434

14 Claims. (Cl. 154—2)

This invention relates to the manufacture of elastic material which may be used for girdles, bandages and similar articles wherein it is desirable to use a material which is resilient and adapted to be stretched in all directions and to conform to the shape or contour of that portion of the body to which it is applied.

It is an object of the present invention, therefore, to produce such articles in the desired shape and having any desired tension depending upon the purpose for which it is intended.

A further object of the invention is to produce such articles by a continuous operation and preferably as the rubber thread from which the articles are made is being produced.

A still further object of the invention is to use latex threads while in a tacky condition so that certain of the threads will adhere to one another when predeterminately arranged upon the application of pressure thereto to produce a substantially unitary, porous structure.

With the objects above indicated and other objects hereinafter explained in view, the invention consists of the new elastic material and the method by which it is made.

Referring to the drawings,

Figure 1 is a fragmentary top plan view of an apparatus showing the manner in which the threads are first arranged in the production of the material embodying the present invention;

Figure 2 is a similar view showing the manner in which the threads are subsequently arranged in the production of the material;

Figure 3 is a sectional view taken on line 3—3 in Figure 2 before the threads are applied;

Figure 4 is a diagrammatic sectional view showing one way in which the material may be treated and cured;

Figure 5 is a plan view of the material after curing;

Figure 6 is a fragmentary view of the material shown in Figure 5 but upon an enlarged scale;

Figure 7 is a sectional view taken on line 7—7 in Figure 5;

Figure 8 is a sectional view of the thread guide taken on line 8—8 in Figure 1;

Figure 9:
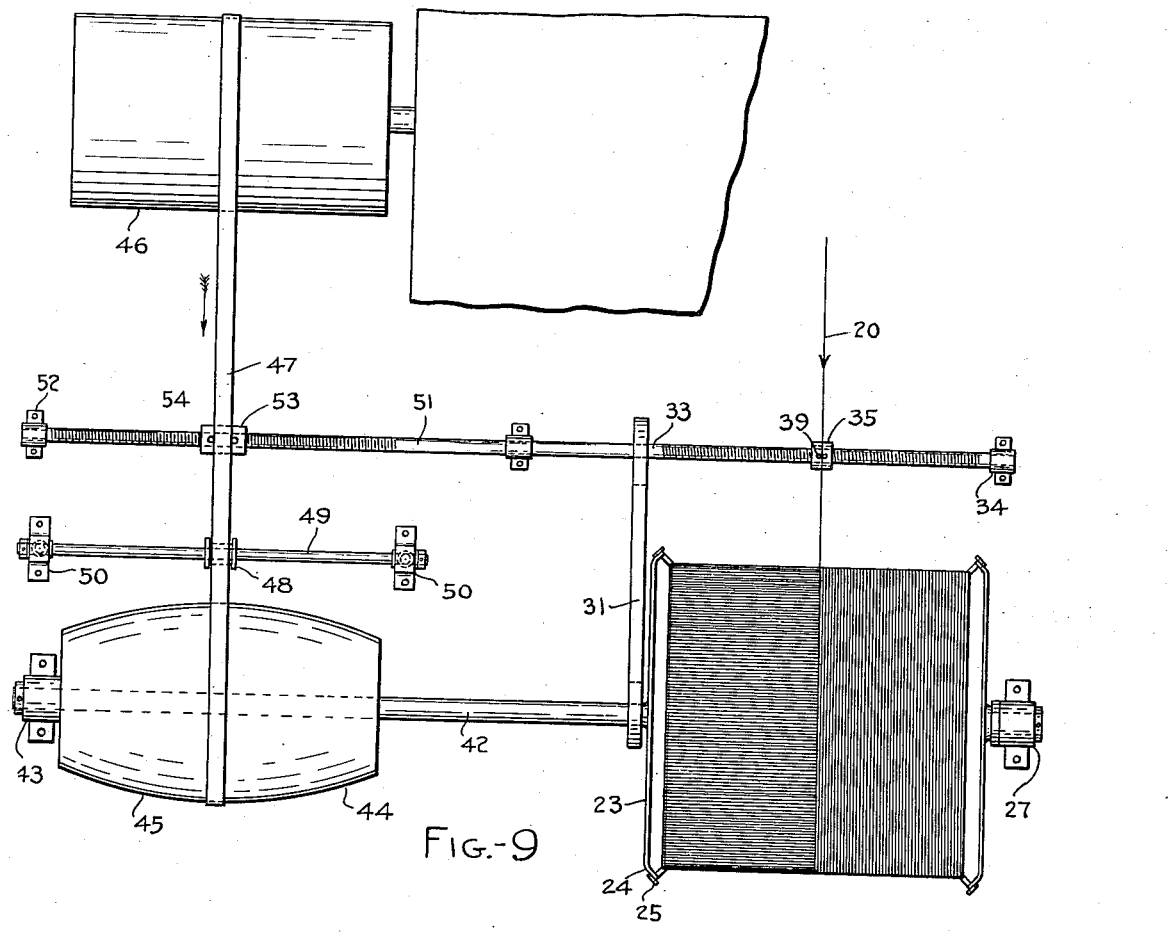
Figure 9 is a plan view similar to Figure 1, but showing a modification for producing pre-shaped material.

In the drawings I have illustrated more or less diagrammatically an apparatus for producing the elastic material embodying the present invention. Furthermore, while many types of rubber threads may be employed in the production of this material, I prefer to use a tensioned, tubular rubber thread having a central core of cotton, silk or other suitable thread incorporated therein so that the elongation of the rubber is limited by the extensibility of the cotton thread core such as is shown in my copending application Serial No. 756,943, filed December 11, 1934.

The material embodying the invention consists of a plurality of rubber threads arranged side by side and having another plurality of rubber threads likewise arranged side by side but extending in a different direction and in superimposed relation, the threads having been pressed together to cause adhesion therebetween and to produce a unitary, porous structure. The rubber threads may be vulcanized before forming the material or the structure may be vulcanized after assembly. This results in an elastic, porous material well suited for girdles, bandages and the like due to its elasticity and porosity which causes the material to adhere to and conform to the shape or contour of that portion of the body to which it is applied and at the same time enables the air to pass therethrough into contact with the body. The material is such that it may be washed without injury thereto, thus permitting reuse of the material and rendering the same sanitary. The material also has long life and will not readily lose its shape as a result of continued stretching.

The material may be made by any desirable apparatus but I have shown one type for the purpose of exemplification. Referring to Figures 1 and 2, a rubber thread 20 is continuously formed by any desirable apparatus such as shown in my aforesaid copending application. A flat metal plate 21 of the desired size and shape has studs 22 secured to the four corners as shown therein and project outwardly therefrom. Resilient supports 23 extend along opposite sides of the plate 21 and have their opposite ends bent inwardly at 24 which are provided with slots to removably receive the adjacent studs 22. Any suitable means may be employed to secure the studs in place, such as nuts 25, so that the supports and plate when assembled operate as a unit.

The supports 23 midway of their ends are provided with shafts 26 extending outwardly in opposite directions and in axial alignment. The outer ends of the shafts 26 are rotatably mounted in bearings 27 secured to any suitable supporting structure (not shown). One of the shafts 26 has a pulley 28 keyed or otherwise secured thereto which is adapted to receive one looped end of a belt 29, the other end being connected to the main drive of the thread forming machine to impart rotation to the plate 21 so that the relative speeds between the thread travel and winding operation may be controlled.

A second pulley 30 is also keyed or otherwise secured to the shaft 26 adjacent the pulley 28 and is adapted to receive one of the looped ends of a belt 31, the other end being secured on a pulley 32 which is keyed or otherwise secured to a transversely extending rod 33, the opposite ends of which are rotatably mounted in bearing 34 supported on any suitable structure (not shown). The rod 33 is exteriorly screw-threaded and operatively supports a guide member 35, more clearly shown in Figure 8. This guide member 35 is in the form of a block 36 having a transverse opening 37 therethrough, the upper portion being provided with a hemispherical depressed portion 38 formed to engage the screw-threads on the rod 33. Rotation of the rod 33 in one direction causes the block 36 to be positively moved axially of the rod in one direction to guide or direct the thread as it comes from the thread-forming machine. The block 36 is provided with an eye 39 on its upper side through which the thread freely passes. The block 36 is returned to its initial position by lifting upwardly and disengaging the thread engaging portions and sliding the block longitudinally of the rod 33 or by any other suitable means.

In the operation of the device the rubber thread 20, preferably under slight tension, is threaded through the eye 39 of the guide 35 with the latter positioned at the extreme right hand side looking at Figure 1. The end of the thread is suitably connected to the adjacent end of the plate 21 and the plate is then rotated by means of the belt 29 from the main drive of the thread-forming machine. As the plate 21 rotates the thread is wound thereabout in successive convolutions, being suitably spaced from one another by means of the traveling guide 35 as shown in Figure 1. When the guide 35 reaches the end of its travel, the plate 21 has been completely covered with the thread and the rotation of the plate is then interrupted. Three of the studs 22 are disconnected from the extensions 24 and the plate is then turned about the remaining stud through an angle of 180°, after which the studs are replaced in the extensions and secured. This movement of the plate 21 causes the threads thereon to assume a position at right angles to the original position of the threads as indicated at the left hand side of Figure 2.

The guide 35 is then returned to its initial position and the thread is again connected to the adjacent end of the plate 21. The plate 21 is then rotated and the thread is wound thereabout in successive convolutions, being suitably spaced from one another by means of the traveling guide 35 as shown in Figure 2. This time the threads are also wound in superimposed relation and, as shown, at right angles to the threads as originally wound, although the angular relationship may be changed if desired.

When the guide 35 reaches the end of its travel, the plate 21 has been completely covered with the thread in a different direction and the rotation of the plate is then stopped. The plate 21 is next removed from the supports 23 and placed in a press, sufficient pressure being supplied to cause the contacting portions of the threads to securely adhere to one another. The rubber thread may be of tacky consistency in the first instance so that the threads will adhere under pressure, or any suitable adhesive material may be employed so as to cause the threads to adhere under pressure. The thread along one edge of the plate may then be cut by any suitable tool and the thread structure removed from plate 21. The thread structure is then vulcanized in any suitable and well-known manner, such as the steam chamber 40 shown in Figure 4, after the tension has been removed. This eliminates any possibility of the rubber structure losing its elasticity. Of course, if pre-cured rubber is used in producing the thread subsequent vulcanization is not necessary but merely drying to obtain a fully vulcanized, elastic material 41, such as shown in Figure 5.

Figure 10:
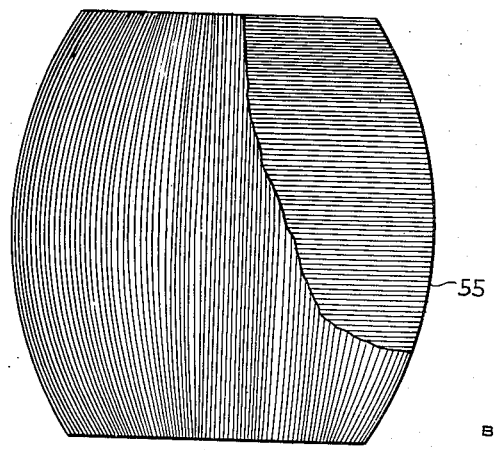
Figure 10 is a plan view of the finished material produced by the apparatus in Figure 9, but on an enlarged scale.

The apparatus shown in Figures 9 and 10 is similar to that shown in the previously described figures except that in producing girdles and other shaped articles it is preferable to provide means for pre-shaping the ultimate elastic article. Any suitable apparatus, of course, may be employed, but a simple addition is shown in Figure 9 which consists of a shaft 42, in place of one of the shafts 26, of longer length having one end connected to one of the supports 23 and its opposite end rotatably mounted in a bracket 43 supported on any suitable structure (not shown). A pulley 44 is keyed or otherwise secured to the outer end of the shaft 42 and has a curved outer surface 45 corresponding to the desired shape of the finished article. A straight face pulley 46 is secured to the main drive mechanism of the thread-forming machine and a belt 47 operatively connects the pulleys so as to impart rotation to the plate 21. Any suitable mechanism may be employed for taking up the slack in the belt, such as a flanged idler 48 engaging the under stretch of the belt and rotatably and slidably mounted upon a transversely extending rod 49, the opposite ends of which are mounted in spring pressed slides carried by brackets 50 and adapted to exert an upward pressure upon the belt to hold the same taut.

The rod 33 of the thread-guiding mechanism has one end extended at 51 and its outer end rotatably mounted in a bearing 52. This portion of the rod is also exteriorly screw-threaded correspondingly with the screw-threaded portion of the rod 33 and has a guide member 53 similar to the guide member 35 operatively mounted thereon. The top of the guide member 53, however, is provided with spaced extensions or pins 54 between which the belt 47 passes and by which the belt is moved laterally across the curved surface 45 of the pulley 44. With this arrangement it is possible to vary the rotation of the plate 21 with respect to the rotation of the main drive of the thread-forming machine and thereby vary the tension of the thread 20 as it is wound about the plate 21. This so tensions the threads that the rubber structure 55 assumes when removed from the plate 21 a shape approximately that shown in Figure 10.

In the operation after the thread has been initially wound upon the plate 21 under uniform tension as before explained and the latter turned to the position in which the threads are at right angles to the original arrangement as indicated at the left hand side in Figure 9, the thread is then wound about the plate 21 as shown at the right hand side of the figure. At the beginning of the second winding the belt 47 has been moved to the right hand end of the pulleys and as the plate 21 is rotated the belt 47 is moved laterally from one end of the pulley 44 to the opposite end upon completion at the same rate of speed as the thread guide 35 moves. Due to the curved surface of the pulley 44, however, the relation of the main drive speed and the rotation of the plate 21 is varied which results in placing the convolutions of the thread under varying tension from one end to the other so as to shape the ultimate elastic article. Various shapes may be produced by merely changing the surface shape of the pulley 44. Also, it will be obvious that the initial winding of the thread on plate 21 may be under varying tension, whereby either or both windings may be under varying tension.

After the thread structure has been thus formed, the subsequent operations are precisely as those heretofore explained in connection with Figures 1 and 2.

Figure 11:
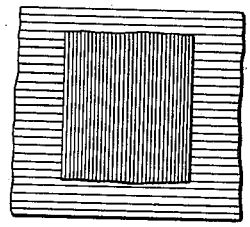
Figure 11 is a fragmentary view of a modified form of material embodying the present invention.

It should further be understood that the threads of the inner and outer covering may be of the same diameter or of different diameters as shown in Figure 11. Furthermore, the spacings between convolutions may be varied to suit the conditions and in order to obtain the desired characteristics in the finished product.

In using plain rubber thread, the degree of stretch is limited only by the elastic limit of the rubber material and therefore may be termed uncontrolled. With the use of a tubular rubber thread with cotton, silk or other core as described in my copending application, the degree of stretch may be predetermined and therefore may be termed controlled. Various articles will require these different types of threads, depending upon the use for which they are intended.

While I have described the preferred embodiments of the invention, it should be understood that I am not to be limited thereto inasmuch as changes and modifications may be resorted to without departing from the spirit of the invention as defined in the appended claims.

What is claimed is:

1. A pre-shaped elastic material consisting solely of a plurality of rubber threads under substantially uniform tension, and a second plurality of rubber threads under non-uniform tension and arranged adjacent to said first-mentioned threads and adhesively interconnected.

2. A preformed elastic girdle consisting solely of a plurality of rubber threads of a determinate tension arranged in tubular form and a second plurality of rubber threads of different tension arranged angularly about said first-mentioned threads and adhesively interconnected.

3. A preformed elastic girdle comprising a plurality of rubber threads of uniform tension arranged in tubular form and a second plurality of rubber threads of non-uniform tension arranged angularly about said first-mentioned threads and adhesively interconnected.

4. A preformed elastic girdle comprising a plurality of rubber threads having a fixed degree of elongation and under uniform tension arranged in tubular form, and a second plurality of rubber threads having a fixed degree of elongation and under non-uniform tension arranged angularly about said first-mentioned threads and adhesively interconnected.

5. An elastic material comprising a plurality of rubber threads of uniform diameter arranged side by side, and a second plurality of rubber threads of different diameter than said first-mentioned threads and arranged angularly in superimposed relation with respect thereto and adhesively interconnected.

6. That method of making elastic material which comprises winding a rubber thread under uniform tension about a form to provide adjacent convolutions, winding a rubber thread under non-uniform tension about the thread bearing form in a different direction to provide adjacent convolutions, applying pressure to adhere the convolutions of one winding to the other, removing the thread structure from the form, and curing the same.

7. That method of making elastic material which comprises winding a rubber thread under uniform tension about a form to provide adjacent convolutions, winding a rubber thread under uniform tension about the thread bearing form in a different direction to provide adjacent convolutions, applying pressure to adhere the convolutions of one winding to the other, severing opposite portions of the thread structure, removing the thread structure from the form, and curing the same.

8. That method of making elastic material consisting solely of rubber threads which comprises continuously forming a rubber thread, winding the thread under tension about a form to provide adjacent convolutions, winding the thread under tension about the thread bearing form in a different direction to provide adjacent convolutions, discontinuing the winding operation, applying pressure to adhere the convolutions of one winding to the other, severing opposite portions of the thread structure to allow its removal from the form, and curing the same.

9. That method of making elastic material which comprises winding a fibrous cored rubber thread under uniform tension about a flat form in successive convolutions, shifting the form, winding the thread under uniform tension about the thread bearing form in successive convolutions which extend transversely with respect to the first-mentioned convolutions, applying pressure to adhere the contacting portions of the respective convolutions, severing opposite portions of the thread structure, removing the thread structure from the form, and subsequently curing the same.

10. That method of making elastic material which comprises winding a fibrous cored rubber thread under uniform tension about a flat form in successive convolutions, shifting the form, winding the thread under non-uniform tension about the thread bearing form in successive convolutions which extend transversely with respect to the first mentioned convolutions, applying pressure to adhere the contacting portions of the respective convolutions, removing the thread structure from the form, and subsequently curing the same.

11. That method of making elastic material which comprises winding a rubber thread under uniform tension about a form to provide adjacent convolutions, winding a rubber thread under non-uniform tension about the thread bearing form in a different direction to provide adjacent convolutions, applying pressure to adhere the convolutions of one winding to the other, and removing the thread structure from the form.

12. That method of making elastic material which comprises winding a rubber thread about a form to provide adjacent convolutions, winding a rubber thread about the thread bearing form in a different direction to provide adjacent convolutions, applying pressure to adhere the convolutions of one winding to the other, and severing a portion of the thread structure to remove it from the form.

13. That method of making elastic material which comprises winding a rubber thread about a form to provide adjacent convolutions, winding a rubber thread about the thread bearing form in a different direction to provide adjacent convolutions, applying pressure to adhere the convolutions of one winding to the other, severing a portion of the thread structure to remove it from the form, and curing the same.

14. A pre-shaped elastic material comprising a plurality of rubber threads under substantially uniform tension, and a second plurality of rubber threads under non-uniform tension and arranged angularly in superimposed relation with respect to said first-mentioned threads and adhesively interconnected.

STERLING W. ALDERFER.